United States Patent [19]

Ehmsen et al.

[11] Patent Number: 5,092,611
[45] Date of Patent: Mar. 3, 1992

[54] FERROFLUID SEAL FOR A SHAFT

[75] Inventors: Roland Ehmsen, Weinheim; Ulrich Fruedenberg, Grosssachsen; Fritz Heck, Weinheim; Rolf Vogt, Oftersheim, all of Fed. Rep. of Germany

[73] Assignee: Firma Carl Freudenberg, Weinheim/Bergstr., Fed. Rep. of Germany

[21] Appl. No.: 548,016

[22] Filed: Jul. 5, 1990

[30] Foreign Application Priority Data

Jul. 7, 1989 [DE] Fed. Rep. of Germany ....... 3922356

[51] Int. Cl.$^5$ ............................................. F16J 15/40
[52] U.S. Cl. ............................................ 277/80; 277/135
[58] Field of Search .................................. 277/80, 135

[56] References Cited

U.S. PATENT DOCUMENTS

| | | | |
|---|---|---|---|
| 4,671,679 | 6/1987 | Heshmot | 277/80 |
| 4,696,481 | 9/1987 | Iversen | 277/80 |
| 4,865,334 | 9/1989 | Raj et al. | 277/80 |

FOREIGN PATENT DOCUMENTS

| | | | |
|---|---|---|---|
| 0187658 | 11/1983 | Japan | 277/80 |
| 0177367 | 8/1987 | Japan | 277/80 |
| 0177368 | 8/1987 | Japan | 277/80 |

Primary Examiner—William A. Cuchlinski, Jr.
Assistant Examiner—Daniel G. DePumpo
Attorney, Agent, or Firm—Kenyon & Kenyon

[57] ABSTRACT

A ferrofluid seal for a shaft comprising several sealing gaps concentrically arrayed about a shaft. Each gap is filled with ferrofluid liquid through a bore-hole. Each of the bore-holes is sealed and hydraulically isolated from the other bore-holes.

11 Claims, 1 Drawing Sheet

FERROFLUID SEAL FOR A SHAFT

BACKGROUND OF THE INVENTION

The invention relates generally to a ferrofluid seal for a shaft, and more particularly to a seal comprising several sealing gaps that lie axially displaced from each other. Each gap is associated with a bore-hole for the radial supply of ferrofluid liquid.

An example of a prior art ferrofluid seal is set forth in U.S. Pat. No. 4,598,914. In this prior art device, a shaft is surrounded by an annular magnet, the internal diameter of which is slightly greater than the shaft diameter. A wishbone-like pattern is cut into the magnet surface facing the shaft. The sealing gap between the magnet and the shaft is sealed with ferrofluid liquid. This fluid is supplied to the sealing gap at a centrally located place within the wishbone pattern by means of a bore-hole. After being charged with ferrofluid, the bore-hole is closed off to the outside. The direction of rotation of the shaft is selected so that it cooperates with the wishbone pattern in generating radial pressure in the ferrofluid. This pressure is at a maximum in the central region of the annular magnet. In this manner, the resulting pressure rise in the central region enables the device to transmit bearing forces to the shaft. A fundamental precondition for this device to operate as desired is that the clearance spaces of the sealing gaps first be filled with ferrofluid liquid, and that the total volume of ferrofluid be accumulated at this location. The pressure retaining capacity of this ferrofluid seal is not very satisfactory.

A second prior art example of a ferrofluid seal for a shaft element is provided by U.S. Pat. No. 4,526,382. In the device of this patent, several sealing gaps displaced from each other in the axial direction circumferentially surround a shaft. The individual sealing gaps are separated from each other by free spaces, through which the ferrofluid liquid contained in the individual sealing gaps is activated independently from each other. The resulting sealing arrangement operates as a spaced apart, multiple-stage arrangement. This structural arrangement provides the ferrofluid seal with an improved pressure retaining capacity. However, it is extremely difficult to supply the ferrofluid liquid to the individual sealing gaps with sufficient dosing accuracy. This can only be done by using complicated auxiliary devices. When a loss of ferrofluid liquid occurs during normal operation, the entire ferrofluid seal has to be disassembled and repaired.

Hence, there remains a need for a ferrofluid seal that features good pressure retaining capacity and which greatly simplifies the procedure of introducing the ferrofluid liquid into the sealing gaps so that the device can more easily be employed and maintained.

SUMMARY OF THE INVENTION

In accordance with the present invention, a shaft is concentrically surrounded by several sealing gaps. The individual sealing gaps are separated from each other by free spaces. Each sealing gap is also assigned a separate bore-hole that serves to supply the gap with ferrofluid liquid and which is closed off with respect to the other bore-holes. The resulting device is simple to charge with ferrofluid. All that is required is that a quantity of ferrofluid liquid (at least as great as the required amount) be introduced into the individual bore-holes. The deployment of the ferrofluid through the bore-holes and into the sealing gaps takes place automatically through the action of the magnetic forces present there. One thereby obtains the advantage not only of a very precise dosing of fluid, but—where a supply of additional ferroliquid is made available—also the additional advantage of automatic refilling of the sealing gaps in the event of a possible loss of ferrofluid liquid.

According to a further refinement of the invention, groups of adjacent bore-holes are filled jointly through a central storage space and are sealed jointly by means of a central closing element. This both simplifies and assures the proper filling of the sealing gaps. The individual sealing gaps are charged with ferrofluid liquid quickly and reliably because the bore-holes, viewed from the axial direction, empty generally concentrically into the individual sealing gaps.

For many applications, the diameter of the bore-hole is for the most part not very significant. For certain applications however, such as those involving shafts moving at high rotational frequencies (where disturbances may be troublesome), certain dimensional relationships are preferred. In such cases, a sealing gap of approximately three to thirty times as long (and preferably between eight to sixteen times as long) as the diameter of the respective bore-hole is suggested.

The bore-holes can also be designed as active capillary openings, so that in the case of extremely high rotational frequencies, it is virtually impossible for forces active in the area of the sealing gaps to be hydraulically transmitted in the direction of the bore-holes. To ensure that the sealing gaps are uniformly filled with ferrofluid liquid in all subregions, it has proven advantageous for the bore-holes to empty essentially perpendicularly into the sealing gaps.

In some application areas, where one must often put up with a loss of ferrofluid liquid, it has proven advantageous for each individual bore-hole to have a separately assigned storage space, and for the individual storage spaces to be distributed circumferentially about the ferrofluid seal. Depending on the spatial extent of the individual storage spaces, considerable reserves of ferrofluid liquid can be made available in this manner for each individual sealing gap. This enables one to control the loss of ferrofluid in a particularly precise manner.

DETAILED DESCRIPTION

Figure 1:
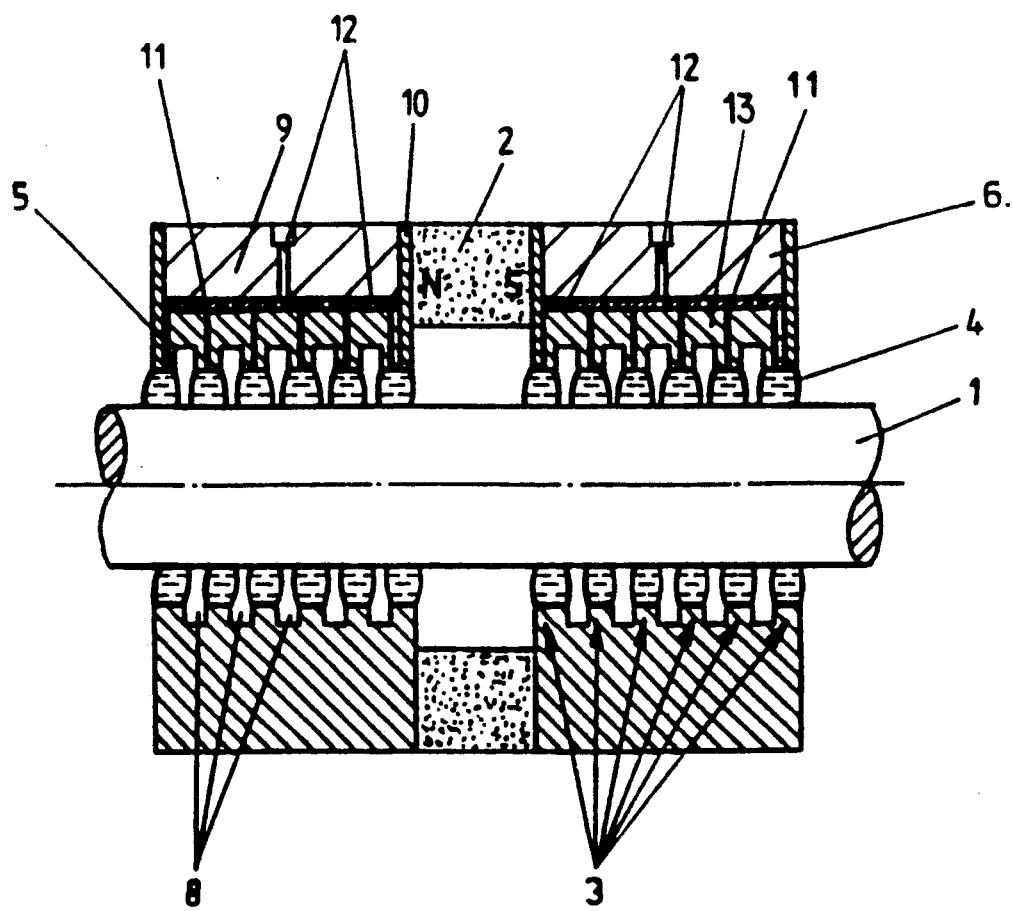
FIG. 1 is a ferrofluid seal in a longitudinal cross-section.

The purpose of the ferrofluid seal shown in FIG. 1 is to seal a rotatable and magnetizable shaft 1. A magnet element or elements 2, placed between sidewalls 10, is circumferentially arranged about a shaft 1. Both poles of the annular magnets 2, which are magnetized in the axial direction, are extended radially in the direction of the shaft by adjacent annular pole pieces 13. Elements 13 are provided with grooves which surround the shaft concentrically and which have an axial clearance from each other. The inwardly extending ridges of these grooves define annular gaps with respect to the shaft into which the ferrofluid is drawn. Free spaces 8 are created between the sealing gaps, which follow one another in the axial direction of the shaft 1. This causes the individual sealing gaps to be effective independently of each other. These sealing gaps communicate via perpendicularly discharging bore-holes 5 with a common storage space 6. (Storage space 6 is shown in FIG. 1 as the region occupied by adjusting screw 9. It can be used as a storage space before the screw is fully inserted.) Storage space 6 is charged with a suitable amount of ferroliquid. This liquid is displaced independently through each of the bore-holes 5 in the direction of the sealing gaps 3 under the influence of the magnetic field which is active in the area of the sealing gap. The ferroliquid 4 is uniformly distributed in the circumferential direction in the sealing gaps 3 and effects a sealing action of the gaps.

After the sealing gaps are filled, the orifices of the bore-holes 5 are sealed with respect to the storage space 6 by a closing element 11. Closing element 11 is penetrated by separate capillary openings which are not aligned with the bore holes, so that when it is pressed down over the bore holes, any excess fluid can be discharged through the closing element capillary openings at a uniform pressure. Element 11, once in place, serves to hydraulically isolate the bore holes from each other. In this manner, one is able to seal off higher pressures in the space to be sealed off.

In addition to the closing element 11, the adjusting screws 9 are also penetrated by capillary openings 12. When adjusting screw 9 is put into place, any excess fluid can be squeezed out of the space 6 through the capillary opening in the adjusting screw. The openings in the adjusting screws are offset from the openings in the closing element (as well as with respect to the orifices of the bore-holes). This ensures that an excess pressure cannot occur in the bore-holes 5 when the bore-holes are sealed.

Figure 2:
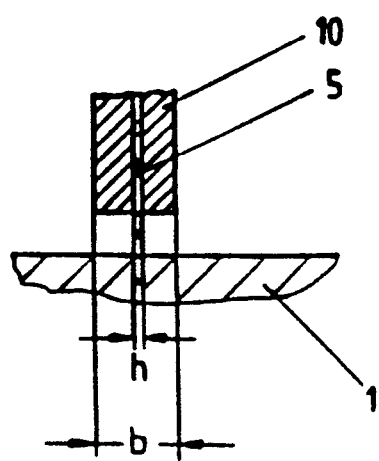
FIG. 2 is an enlarged section of a bore-hole of FIG. 1.

A single sealing gap of the ferrofluid seal depicted in FIG. 1 is represented in enlarged scale in FIG. 2 in a longitudinal section. The figure shows the longitudinal length b of the gap in relation to the diameter h of the bore-hole. For applications which require high rotational frequencies, it is suggested that the sealing gap b be approximately three to thirty times as long (and preferably between eight to sixteen times as long) as the diameter h of the respective bore-hole.

What is claimed is:

1. A ferrofluid seal for a shaft, comprising:
   a) a magnet having an inner circumference through which a shaft to be sealed can be inserted;
   b) a north pole-piece disposed adjacent one pole of the magnet, said north pole-piece having a central opening;
   c) a south pole-piece disposed adjacent the other pole of the magnet, said fourth pole-piece having a central opening;
   d) said magnet and pole-pieces defining a longitudinally cylindrical space through which a shaft to be sealed can be inserted;
   e) a plurality of sealing gaps formed by a clearance between the central openings of the pole-pieces and an outer circumference of a shaft to be sealed, said sealing gaps being concentrically disposed along the longitudinal axis of the cylindrical space; and
   f) a plurality of sealable bore-holes radially formed in said pole-pieces, each bore-hole being separate from the other bore-hole and communicating with one of said sealing gaps for individually supplying ferrofluid liquid to that sealing gap, and the bore holes associated with the north pole-piece being hydraulically separate from the bore holes associated with the fourth pole-piece.

2. The ferrofluid seal of claim 1, comprising at least one central storage space for supplying ferrofluid to a plurality of bore-holes simultaneously; and
   a central closing element for hydraulically sealing off a plurality of bore holes after they have been filled with the desired amount of ferrofluid.

3. The ferrofluid seal of claim 1, wherein the boreholes are configured so that when viewed from the axial direction of a shaft to be sealed, they fill the sealing gaps about a shaft to be sealed in a generally uniform circumferential manner for sealing about the shaft.

4. The ferrofluid seal of claim 2, wherein the boreholes are configured so that when viewed from the axial direction, they fill the sealing gaps about the shaft in a generally even concentric manner for sealing about the shaft.

5. The ferrofluid seal of claim 1, wherein the size of the sealing gap is between three to thirty times as great as the diameter of the bore-hole with which it is associated.

6. The ferrofluid seal of claim 1, wherein the size of the sealing gap is between eight to sixteen times as great as the diameter of the bore-hole with which it is associated.

7. A ferrofluid seal for a shaft, comprising:
   at least one annular magnet;
   annular pole-pieces magnetically coupled to said magnet, each pole-piece comprising an annular circumferential ridge protruding into the central region surrounded by the pole piece, thereby defining spaced circumferential gaps about the shaft; and
   a plurality of bore-holes, each leading from the outer surface of the pole piece into the inner gap-defining surface of a corresponding gap-defining ridge, wherein the boreholes associated with the first pole-piece are hydraulically isolated from the bore holes associated with the second pole-piece.

8. The ferrofluid seal of claim 7, comprising a sealing element with a plurality of capillary openings for simultaneously closing off a plurality of boreholes with respect to the outer surface of the annular pole piece.

9. The ferrofluid seal of claim 8, wherein the capillary openings within the sealing element are arrayed so as not to be coincident with the bore-holes.

10. The ferrofluid seal of claim 7, comprising a space above the bore-holes defining a common storage space for the provision of ferrofluid to said group of bore-holes.

11. The ferrofluid seal of claim 10, comprising an adjusting screw containing a capillary opening, said adjusting screw being configured to fit into the common storage space.

* * * * *

UNITED STATES PATENT AND TRADEMARK OFFICE
CERTIFICATE OF CORRECTION

PATENT NO. : 5,092,611

DATED : March 3, 1992

INVENTOR(S) : Roland Ehmsen, et al

It is certified that error appears in the above-identified patent and that said Letters Patent is hereby corrected as shown below:

Column 4, line 8, change "fourth" to --south--.

Signed and Sealed this

Twenty-fourth Day of August, 1993

Attest:

BRUCE LEHMAN

*Attesting Officer*     *Commissioner of Patents and Trademarks*